United States Patent
Scanlan (10) Patent No.: US 8,804,201 B1
(45) Date of Patent: Aug. 12, 2014

(54) SYSTEM AND METHOD FOR CHARACTERIZING A SCANNED IMAGE ARTIFACT AND MODIFYING A SCANNED IMAGE BASED THEREON

(75) Inventor: Nancy J. Scanlan, Murphy, TX (US)

(73) Assignee: Banctec, Inc., Dallas, TX (US)

( * ) Notice: Subject to any disclaimer, the term of this patent is extended or adjusted under 35 U.S.C. 154(b) by 185 days.

(21) Appl. No.: 13/439,038

(22) Filed: Apr. 4, 2012

(51) Int. Cl.
*H04N 1/387* (2006.01)
*H04N 1/409* (2006.01)
*G06T 5/00* (2006.01)
*G06T 5/50* (2006.01)

(52) U.S. Cl.
USPC .......................... 358/3.26; 358/463; 382/275

(58) Field of Classification Search
CPC ........................ H04N 1/4095; H04N 1/4097
See application file for complete search history.

(56) References Cited

U.S. PATENT DOCUMENTS

| | | | |
|---|---|---|---|
| 5,003,613 A | 3/1991 | Lovelady et al. | |
| 5,335,086 A * | 8/1994 | Kitamura | 358/463 |
| 5,335,292 A | 8/1994 | Lovelady et al. | |
| 5,422,743 A * | 6/1995 | Farrell et al. | 358/537 |
| 5,448,376 A * | 9/1995 | Ohta | 358/452 |
| 5,600,732 A | 2/1997 | Ott et al. | |
| 5,784,503 A | 7/1998 | Bleecker, III et al. | |
| 5,850,478 A * | 12/1998 | Suzuki et al. | 382/204 |
| 5,923,788 A * | 7/1999 | Rao | 382/275 |
| 6,327,056 B1 | 12/2001 | Tsai et al. | |
| 6,351,553 B1 | 2/2002 | Hayosh | |
| 6,614,471 B1 | 9/2003 | Ott | |
| 6,650,441 B1 * | 11/2003 | Horigome et al. | 358/474 |
| 7,376,258 B2 | 5/2008 | Klein et al. | |
| 7,433,098 B2 | 10/2008 | Klein et al. | |
| 7,697,728 B2 | 4/2010 | Emerson et al. | |
| 7,826,675 B2 | 11/2010 | Kisilev | |
| 7,995,253 B2 * | 8/2011 | Kagami | 358/496 |
| 7,999,828 B2 * | 8/2011 | Takami et al. | 345/619 |
| 8,023,717 B1 | 9/2011 | Gudenburr et al. | |
| 8,023,718 B1 | 9/2011 | Gudenburr et al. | |
| 8,395,832 B2 * | 3/2013 | Iwamoto | 358/518 |
| 2013/0229695 A1 * | 9/2013 | Lei et al. | 358/448 |

* cited by examiner

*Primary Examiner* — Scott A Rogers (57) ABSTRACT

A scanned image processing system, a method of processing scanned images and a document conversion system incorporating the scanned image processing system or the method. In one embodiment, the scanned image processing system includes: (1) an artifact characterizer configured to provide a characterization of at least one artifact on at least one of obverse and reverse scanned images of a page and (2) an image modifier associated with the artifact characterizer and configured to modify at least one of the obverse and reverse scanned images based on the characterization and at least one operating parameter.

30 Claims, 7 Drawing Sheets

SYSTEM AND METHOD FOR CHARACTERIZING A SCANNED IMAGE ARTIFACT AND MODIFYING A SCANNED IMAGE BASED THEREON

TECHNICAL FIELD

This application is directed, in general, to document scanning systems and, more specifically, to document conversion systems configured to derive a sequence of scanned images from a corresponding sequence of source documents.

BACKGROUND

Modern, high-speed document scanners are employed in various environments to scan a sequence of source documents printed on physical media (typically paper) to yield a corresponding sequence of electronic, scanned images. This is often called "document conversion," but it should be understood that the document conversion process does not destroy the source documents.

One application for document conversion is found in the financial industry. Years ago, financial documents such as checks, invoices, payment advices, vouchers, drafts and credit card charges physically entered and cleared a presentment process involving financial institutions and clearinghouses that ultimately resulted in the transfer of money among the financial institutions and their accountholders. Unfortunately, physical presentment is relatively error-prone, time-consuming and expensive. Accordingly, a superior alternative to physical presentment has been sought for decades.

A few years ago the alternative finally arrived in the form of electronic presentment. Now, most if not all financial documents are converted into electronic, scanned images as a first step in electronic presentment. Thereafter, the scanned images are transmitted through a presentment network of computer systems at the financial institutions and clearinghouses to clear and ultimately cause money to be transferred among the institutions and accountholders. The source documents are usually archived temporarily for evidentiary purposes, then destroyed.

Though electronic presentment (as well as other processes that make use of document conversion) are now predominantly "paper-free," document conversion itself still typically involves the handling of physical media and is thus subject to the practical complications that documents printed on physical media present. For example, the media on which the documents are printed may not be pristine. The media may be stapled, hole-punched, folded, crumpled, stained or otherwise compromised. It may be torn or cut such that a portion of the document is missing. The document itself may be a photocopy of an original and therefore may contain artifacts from the original that impact the document in addition to any damage to the media on which the photocopied document is printed.

SUMMARY

One aspect provides a scanned image processing system. In one embodiment, the scanned image processing system includes: (1) an artifact characterizer configured to provide a characterization of at least one artifact on at least one of obverse and reverse scanned images of a page and (2) an image modifier associated with the artifact characterizer and configured to modify at least one of the obverse and reverse scanned images based on the characterization and at least one operating parameter.

Another aspect provides a method of processing scanned images. In one embodiment, the method includes: (1) providing a characterization of at least one artifact on at least one of obverse and reverse scanned images of a page and (2) modifying at least one of the obverse and reverse scanned images based on the characterization and at least one operating parameter.

Yet another aspect provides a document conversion system. In one embodiment, the document conversion system includes: (1) an image scanner configured to derive a sequence of obverse and reverse scanned images from a corresponding sequence of paper documents, (2) an artifact characterizer configured to provide characterizations of artifacts on the obverse and reverse scanned images, (3) an image modifier associated with the artifact characterizer and configured to modify at least one of the obverse and reverse scanned images based on the characterization and at least one operating parameter, (4) a scanned images database associated with the image scanner and configured to store at least some of the obverse and reverse scanned images and (5) a network interface associated with the scanned images database and configured to transmit at least some of the obverse and reverse scanned images to a network.

BRIEF DESCRIPTION

Reference is now made to the following descriptions taken in conjunction with the accompanying drawings, in which.

DETAILED DESCRIPTION

As stated above, document conversion involves the handling of physical media and is thus subject to the practical complications that documents printed on physical media (most often paper) present. Various ways in which the media on which documents are printed may be damaged have been described above. As further described above, the document itself may be a photocopy and therefore may contain artifacts from the original that impact the document in addition to any damage to the media on which the photocopied document is printed.

It is recognized herein that it is advantageous to identify and characterize the artifacts that scanned images may have. It is further recognized that characterization allows certain actions to be taken automatically with respect to the scanned images that improves them, improves their subsequent processing or decreases the time, bandwidth or cost of storing scanned images or transmitting them over a network. It is still further recognized that users may advantageously control the manner in which such actions are or are not taken.

Accordingly, described herein are various embodiments of a document conversion system, a scanned image processing system and a method of processing scanned images in which a characterization of at least one artifact on at least one of obverse and reverse scanned images of a page (a unit of physical media) is provided. Then, at least one of the obverse and reverse scanned images may be modified in accordance with the characterization and at least one operating parameter, which may be user-configurable.

In one embodiment, the characterization is that the page corresponding to the obverse and reverse scanned images contains a staple puncture or a hole punch ("at least one of a staple puncture and a hole punch"). In another embodiment, the characterization is that a photocopy of at least one staple puncture or hole punch is printed on the page. In yet another embodiment, the characterization is that the page contains at least one missing peripheral portion. In still another embodiment, the characterization is that a photocopy of at least one missing peripheral portion is printed on the page. In still yet another embodiment, the characterization is that the page was folded when the obverse and reverse scanned images were created. In yet still another embodiment, the characterization is that the page is blank on one of its sides.

In one embodiment, the at least one operating parameter is configured to cause the image modifier to take no action with respect to the obverse and reverse scanned images. In another embodiment, the at least one operating parameter is configured to cause the image modifier to associate a flag representing the characterization with at least one of the obverse and reverse scanned images. The flag may be employed for subsequent (e.g., manual) processing. In yet another embodiment, the at least one operating parameter is configured to cause the image modifier to modify at least one of the obverse and reverse scanned images by removing at least one artifact. In this manner, staple-puncture, hole-punch and torn-page artifacts may be removed. In alternative embodiments, the at least one artifact may be emphasized or deemphasized, perhaps by changing its color or contrast.

In still another embodiment, the at least one operating parameter is configured to cause the image modifier to modify at least one of the obverse and reverse scanned images by replacing a portion of one of the obverse and reverse scanned images with a rotated portion of another of the obverse and reverse scanned images. Thus, the portion of the document that is folded over and hence contained on the other of the obverse and reversed scanned images may be moved or copied back to the scanned image on which it belongs, at least partially repairing the scanned image initially missing the portion by reason of the fold. In still yet another embodiment, the at least one operating parameter is configured to cause the image modifier to modify at least one of the obverse and reverse scanned images by deleting one of the obverse and reverse scanned images. Deleting scanned images that contain little or no information likely decreases the time, bandwidth or cost of storing scanned images or transmitting them over a network.

Figure 1:
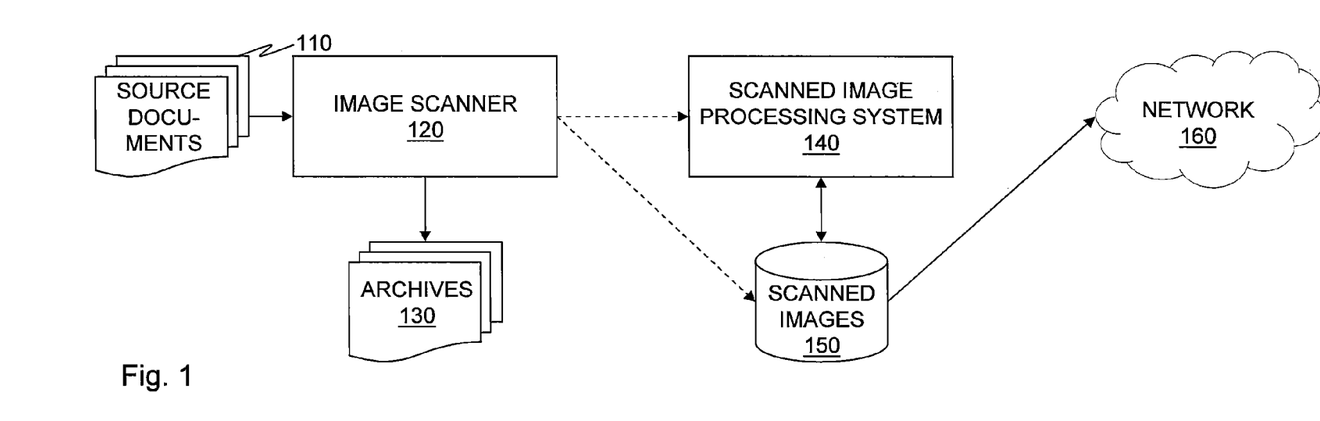
FIG. 1 is a high-level block diagram of one embodiment of a document conversion system.

FIG. 1 is a high-level block diagram of one embodiment of a document conversion system. The document conversion system operates to "convert" (as that term has been explained above) a sequence of source documents 110 into electronic, scanned images. While the sequence of source documents 110 may consist of a singe page, it typically includes many pages (perhaps dozens, hundreds, thousands, millions or even greater numbers of pages). The documents need not relate to one another, need not be in any particular order, and need not be printed on paper. They can be printed on any material that can be scanned, including paper, cardboard, plastic, metal, glass and other media, substrates or structures. They can be printed in black-and-white, greyscale or color. They can include boxes, envelopes, bags, trays and bins. They can include objects of any type from which an electronic, scanned image can be formed. Accordingly, the documents need not consist of alphanumeric characters, but may include either or both of alphanumeric, special characters or symbols in any alphabet or language or images or any object or collection of objects that can be scanned and "converted" into one or more electronic, scanned images.

An image scanner 120 is configured to receive and derive a sequence of obverse (i.e., front-surface or A-side) and reverse (i.e., rear-surface or B-side) scanned images from each "page" (a unit of physical media) of a corresponding sequence of source documents 110. In doing so, the image scanner 120 may associate (e.g., by scanned image identification numbers or codes) the obverse and reverse scanned images corresponding to a particular page either on the basis of the manner in which the page was scanned or by analyzing obverse and reverse scanned images and finding correlations in the scanned image that indicate that they came from the same page. In an alternative embodiment, another piece of equipment may be employed to associate corresponding obverse and reverse scanned images. The manner in which the image scanner 120 or another piece of equipment may do so is known to those skilled in the pertinent art and not important to an understanding of the teachings of this disclosure.

Once converted, the source documents 110 may be destroyed or placed in archives 130. In one embodiment, the image scanner 120 is configured to provide the sequence of obverse and reverse scanned images directly to a scanned image processing system 140. In an alternative embodiment, the image scanner 120 is configured to provide the sequence of obverse and reverse scanned images to a scanned images database 150 configured to store at least some of the obverse and reverse scanned images. The scanned image processing system 140 then interacts with the scanned images database 150 to process the scanned images stored therein.

The illustrated embodiment of the scanned image processing system 140 is generally configured to provide a characterization of at least one artifact on at least one of an associated pair of obverse and reverse scanned images of a page. Then, the scanned image processing system 140 is generally configured to modify (i.e., alter, provide an overlay for later use or delete) at least one of the obverse and reverse scanned images in accordance with the characterization and at least one operating parameter. In the illustrated embodiment, the at least one operating parameter is user-configurable.

A network interface, schematically shown as a line between the scanned images database 150 and a network 160, is configured to transmit at least some of the obverse and reverse scanned images to the network 160. In one embodiment, the network 150 is the Internet. In another embodiment, the network 150 is a private network. In yet another embodiment, the network 150 is a virtual private network existing within the Internet.

Figure 2:
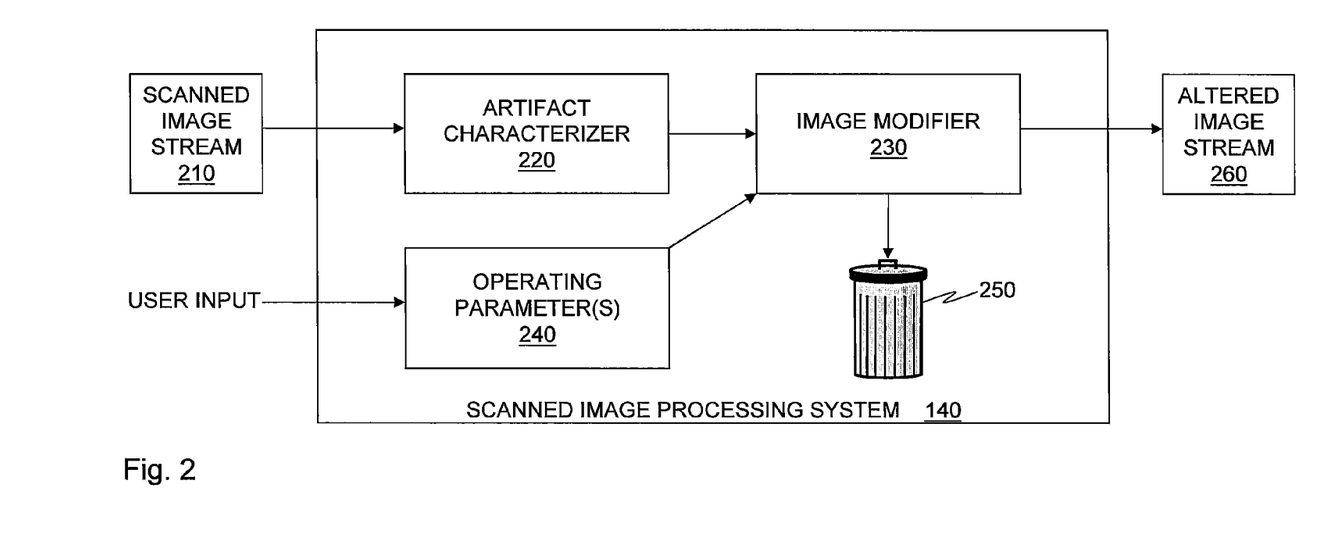
FIG. 2 is a block diagram of one embodiment of the scanned image processing system of FIG. 1.

FIG. 2 is a block diagram of one embodiment of the scanned image processing system 140 of FIG. 1. The illustrated embodiment of the scanned image processing system 140 is generally configured to receive a stream of scanned images (a scanned image stream 210) containing obverse and reverse scanned images of pages and produce a stream of altered scanned images (an altered image stream 260). The altered image stream 260 contains at least one scanned image that has been modified or deleted from the scanned image stream 210.

The scanned image processing system 140 of FIG. 2 includes an artifact characterizer 220. The artifact characterizer 220 is generally configured to identify and characterize artifacts in obverse and reverse scanned images contained in the scanned image stream 210. In the illustrated embodiment, the artifact characterizer 220 is configured to identify artifacts by searching scanned images for presences of known artifact patterns or absences of known patterns indicating an artifact. To do so, the illustrated embodiment of the artifact characterizer 220 searches the scanned images for the substantially linear edges of the scanned pages. Other embodiments employ other conventional or later-developed techniques.

After finding the edges of corresponding obverse and reverse scanned images of a particular page, the illustrated embodiment of the artifact characterizer 220 may, for example, search for the presence of proximate dark dashes or dots located near the edges of the page that indicate a staple puncture. If both the obverse and reverse scanned images contain corresponding staple-puncture artifacts, the characterization is that the page corresponding to the obverse and reverse scanned images contains a staple puncture. If only one of the obverse and reverse scanned images contains staple-puncture artifacts, the characterization is that the page is a photocopy of a document containing a staple puncture.

As another example, the illustrated embodiment of the artifact characterizer 220 may search scanned images for the presence of a dark circle located near the edges of the page that indicate a hole punch. The presence or absence of corresponding (typically mirror-image) dark dashes, dots or circles on obverse and reverse scanned images of a particular page indicate whether or not the page is a photocopy. If both the obverse and reverse scanned images contain corresponding hole-punch artifacts, the characterization is that the page corresponding to the obverse and reverse scanned images contains a hole punch. If only one of the obverse and reverse scanned images contains hole-punch artifacts, the characterization is that the page is a photocopy of a document containing a hole punch.

As yet another example, the illustrated embodiment of the artifact characterizer 220 may determine whether or not the edges of a page form a quadrilateral. A quadrilateral having a nonstandard or unusual aspect ratio may indicate the presence of a vertical or horizontal cut or fold. Interruptions in otherwise relatively straight edges often indicate that a portion of the page is missing. Substantially linear interruptions in the relatively straight lines of the boundaries often indicate that a portion of the page has been cut or was folded during photocopying or scanning. The presence of edge lines that extend into the page on the corresponding scanned image may indicate the presence of a fold. The characterization is that the page was folded when the obverse and reverse scanned images were created.

Substantially irregular interruptions may indicate that a page has been torn. The presence or absence of corresponding interruptions on obverse and reverse scanned images of a page indicate whether or not the page is a photocopy. The characterization may thus be that the page contains at least one missing peripheral portion or that a photocopy of at least one missing peripheral portion is printed on the page.

Those skilled in the pertinent art recognize that a substantial body of technology has been developed in the area of pattern recognition. Those skilled in the pertinent art will also recognize that this technology, as well as pattern-recognition technology that will be developed in the future may be applied to the disclosure herein to yield advantageous embodiments of the artifact characterizer 220.

The scanned image processing system 140 of FIG. 2 further includes an image modifier 230. The image modifier 230 is associated with the artifact characterizer 220 and configured to modify at least one of the obverse and reverse scanned images based on the characterization and at least one operating parameter. In the illustrated embodiment, operating parameter(s) 240 are predetermined, stored and provided to the image modifier 230 during its operation. In one embodiment, the scanned image processing system is configured to allow a user to provide the operating parameter(s) 240, as FIG. 2 indicates. In an alternative embodiment, the operating parameter(s) 240 are preset, and out of the user's control.

As described above, the image modifier 230 yields an altered image stream 260, typically containing both modified and unmodified scanned images. If the operating parameter(s) 240 are such that the image modifier 230 is configured to delete scanned images under certain conditions, those scanned images are either destroyed or sent to a "trash can" or "recycle bin," 250, where they may be held for subsequent deletion.

Figure 3:
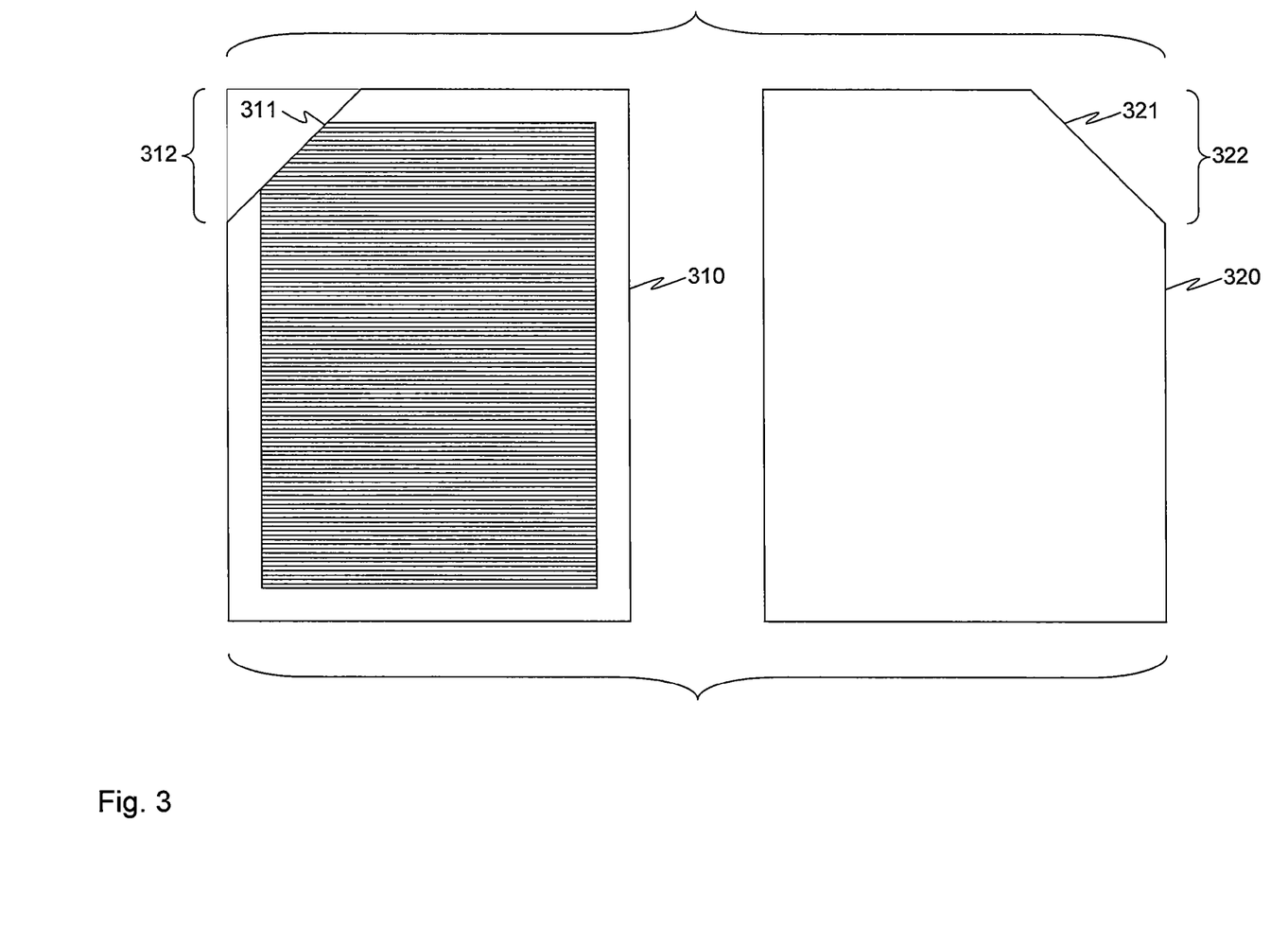
FIG. 3 is a diagram representing corresponding obverse and reverse scanned images of a first example page.

FIG. 3 is a diagram representing corresponding obverse and reverse scanned images 310, 320 of a first example page. The obverse scanned image 310 contains an artifact 311, namely a diagonal edge in its upper, left-hand corner. The artifact 311 indicates a missing portion 312. The reverse scanned image 320 contains a corresponding artifact 321 and missing portion 322, but lacks a folded portion. Together, this indicates that the scanned page is not folded, and is not a photocopy of a page missing a portion, but is actually missing the portion. The artifact characterizer 220 of FIG. 2 thus provides one or more appropriate characterizations, and the image modifier 230 of FIG. 2 processes the obverse and reverse scanned images 310, 320 based on the one or more characterizations and the operating parameter(s) 240 of FIG. 2.

Figure 4:
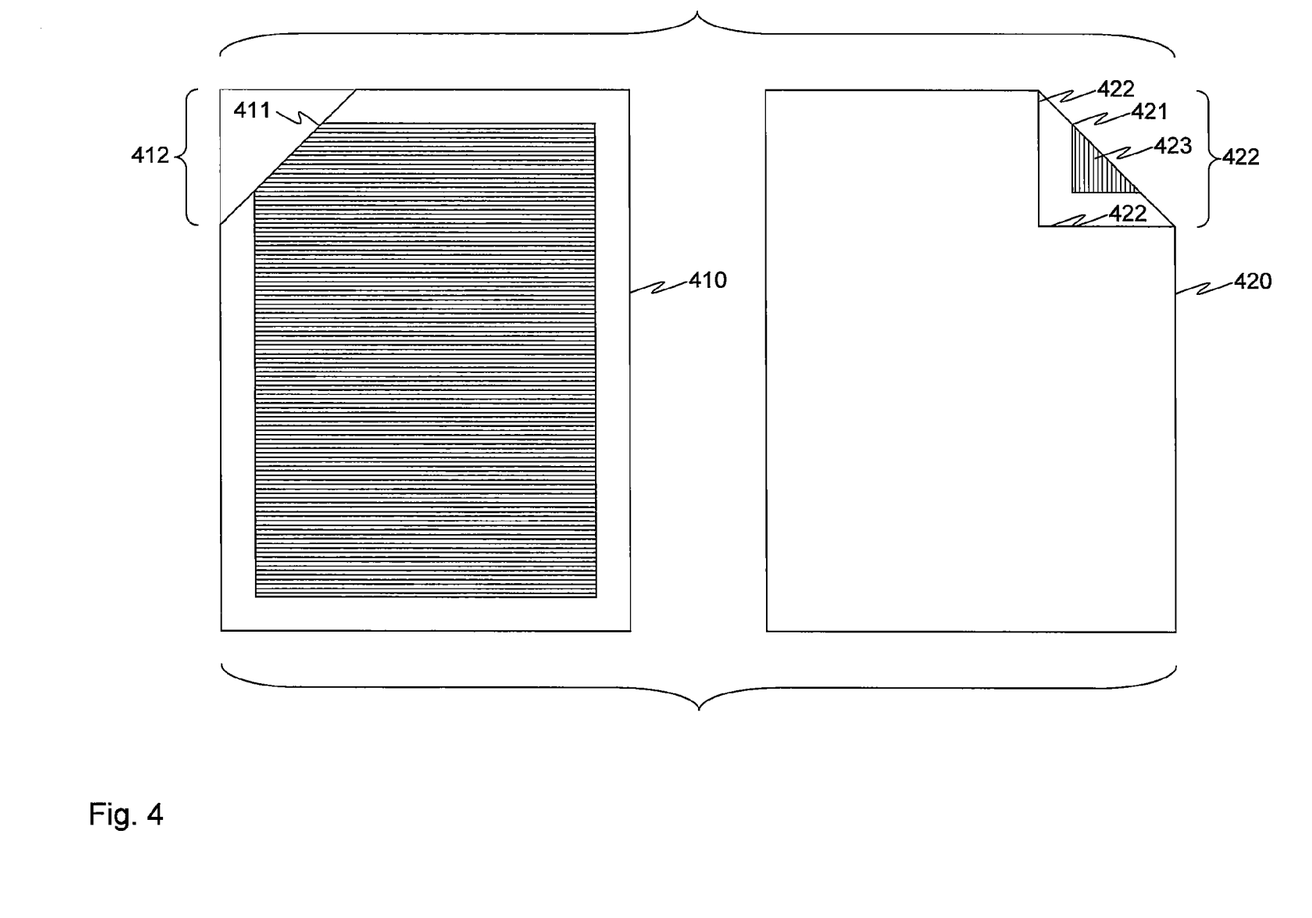
FIG. 4 is a diagram representing corresponding obverse and reverse scanned images of a second example page.

FIG. 4 is a diagram representing corresponding obverse and reverse scanned images 410, 420 of a second example page. The obverse scanned image 410 contains an artifact 411, namely a diagonal edge in its upper, left-hand corner. The artifact 411 indicates a missing portion 412. The reverse scanned image 420 contains a corresponding artifact 421. However, the reverse scanned image 420 indicates the presence of edge lines 422 that extend into the page, indicating a folded portion 423. Together, this indicates that the scanned page is folded. The artifact characterizer 220 of FIG. 2 thus provides the appropriate characterizations, and the image modifier 230 of FIG. 2 processes the obverse and reverse scanned images 410, 420 based on the characterizations and the operating parameter(s) 240 of FIG. 2. In the illustrated embodiment, the operating parameter(s) 240 of FIG. 2 are such that the image modifier 230 of FIG. 2 is directed to modify at least the obverse scanned image 410.

Figure 5:
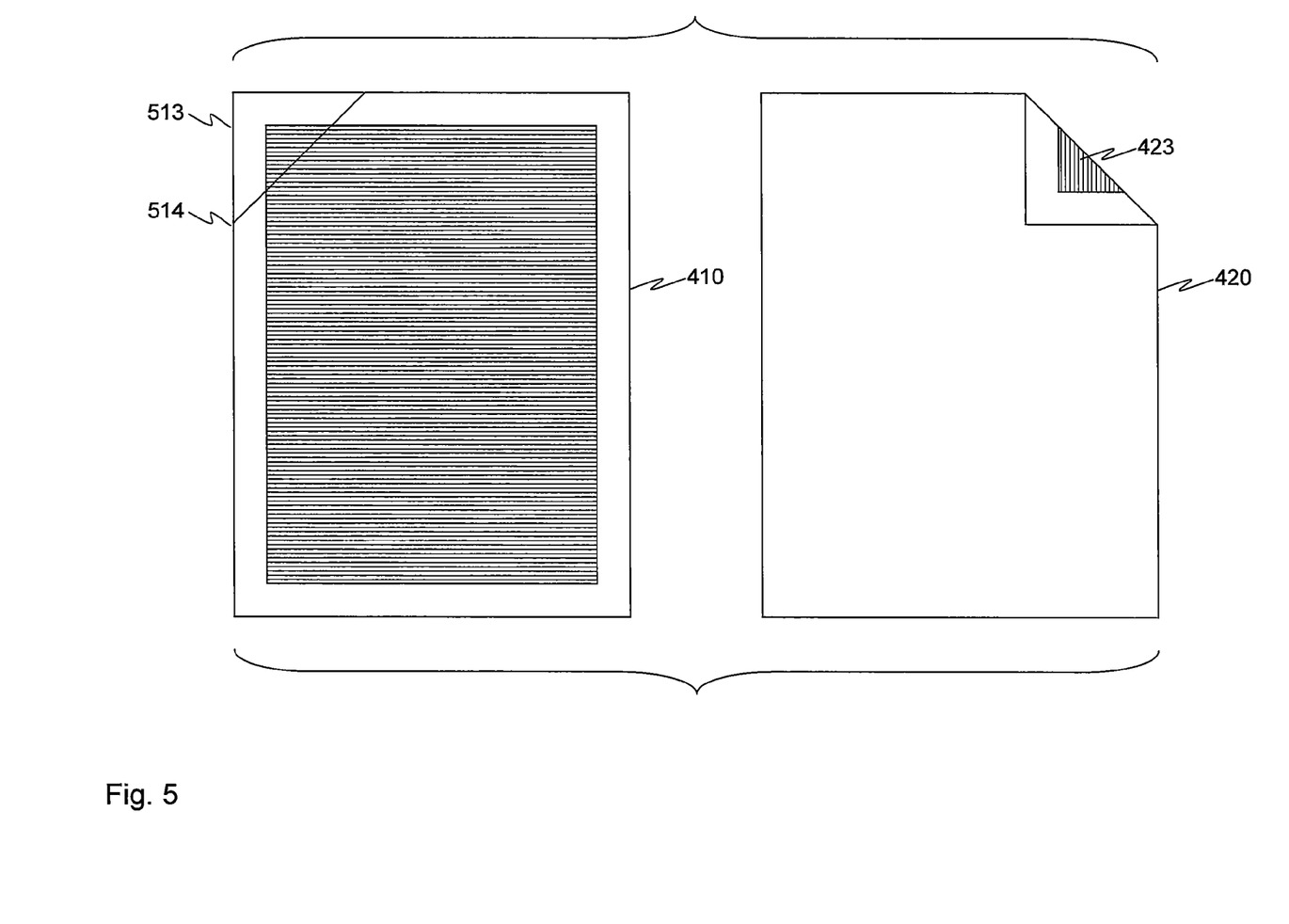
FIG. 5 is a diagram representing corresponding obverse and reverse scanned images of the second example page as modified.

FIG. 5 is a diagram representing corresponding obverse and reverse scanned images 410, 420 of the second example page as modified. In repairing the obverse scanned image 410 according to the examples of FIGS. 4 and 5, the image modifier 230 of FIG. 2 copies the folded portion 423, rotates it 90° clockwise about an axis normal to the plane of the image, and applies it over the missing portion 412 resulting in a repaired portion 513. An artifact 514 evidencing the repair, namely a diagonal line, may or may not be allowed to remain.

Figure 6:
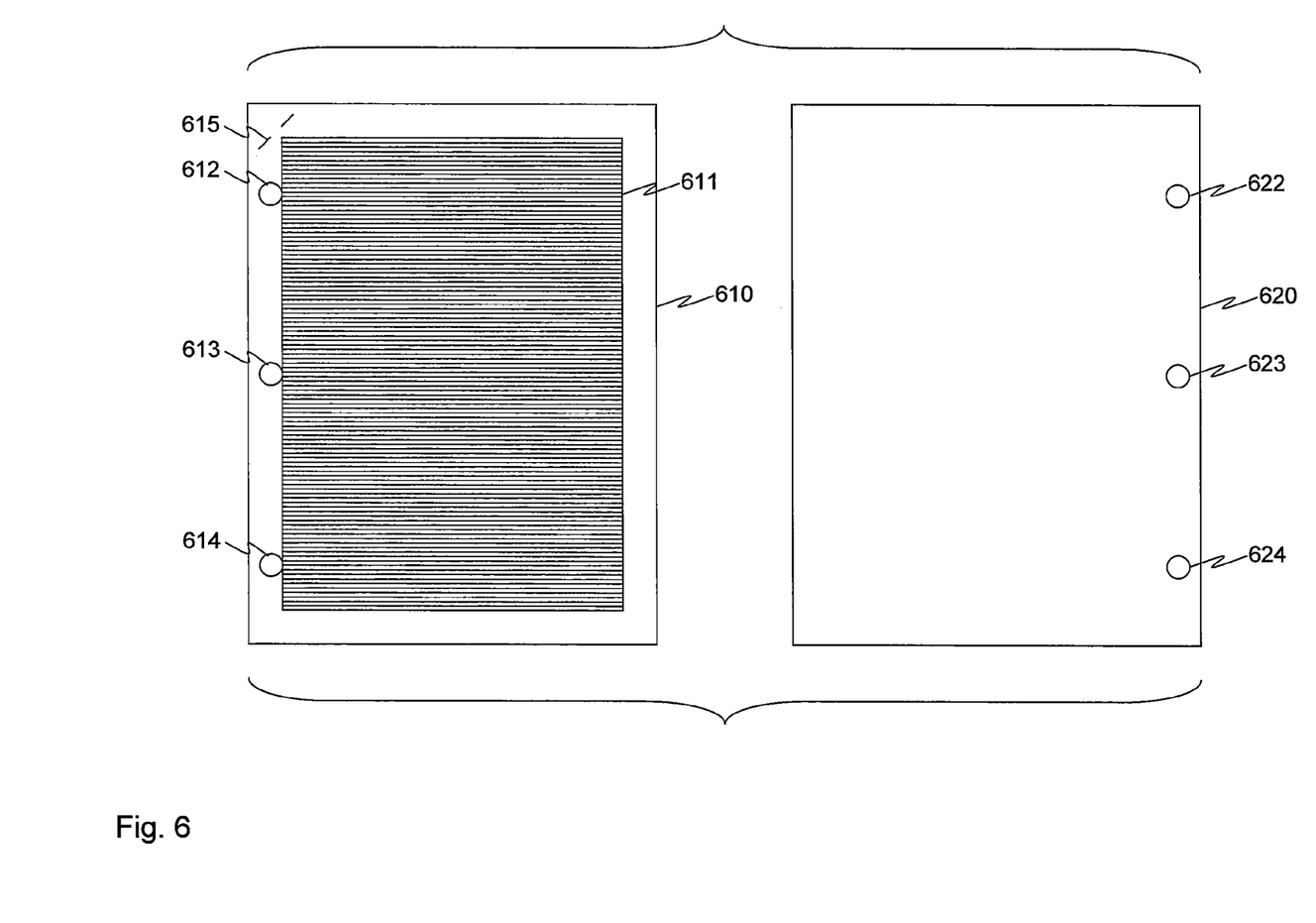
FIG. 6 is a diagram representing corresponding obverse and reverse scanned images of a third example page.

FIG. 6 is a diagram representing corresponding obverse and reverse scanned images 610, 620 of a third example page. The obverse scanned image 610 contains typewritten text 611. The obverse scanned image 610 also contains several artifacts, namely three hole-punch artifacts 612, 613, 614 and a staple-puncture artifact 615. The reverse scanned image 620 lacks typewritten text and a corresponding staple-puncture artifact, but contains corresponding hole-punch artifacts 622, 623, 624. Together, this indicates that the scanned page is hole-punched, single-sided photocopy of a page that had been stapled to other pages at one time. The artifact characterizer 220 of FIG. 2 thus provides one or more appropriate characterizations, and the image modifier 230 of FIG. 2 processes the obverse and reverse scanned images 610, 620 based on the one or more characterizations and the operating parameter(s) 240 of FIG. 2. For example, the operating parameter(s) 240 of FIG. 2 may be such that the image modifier 230 of FIG. 2 is directed to remove the staple puncture artifact 615 but leave the hole punch artifacts 612, 613, 614, 622, 623, 624 intact, or perhaps vice-versa.

Figure 7:
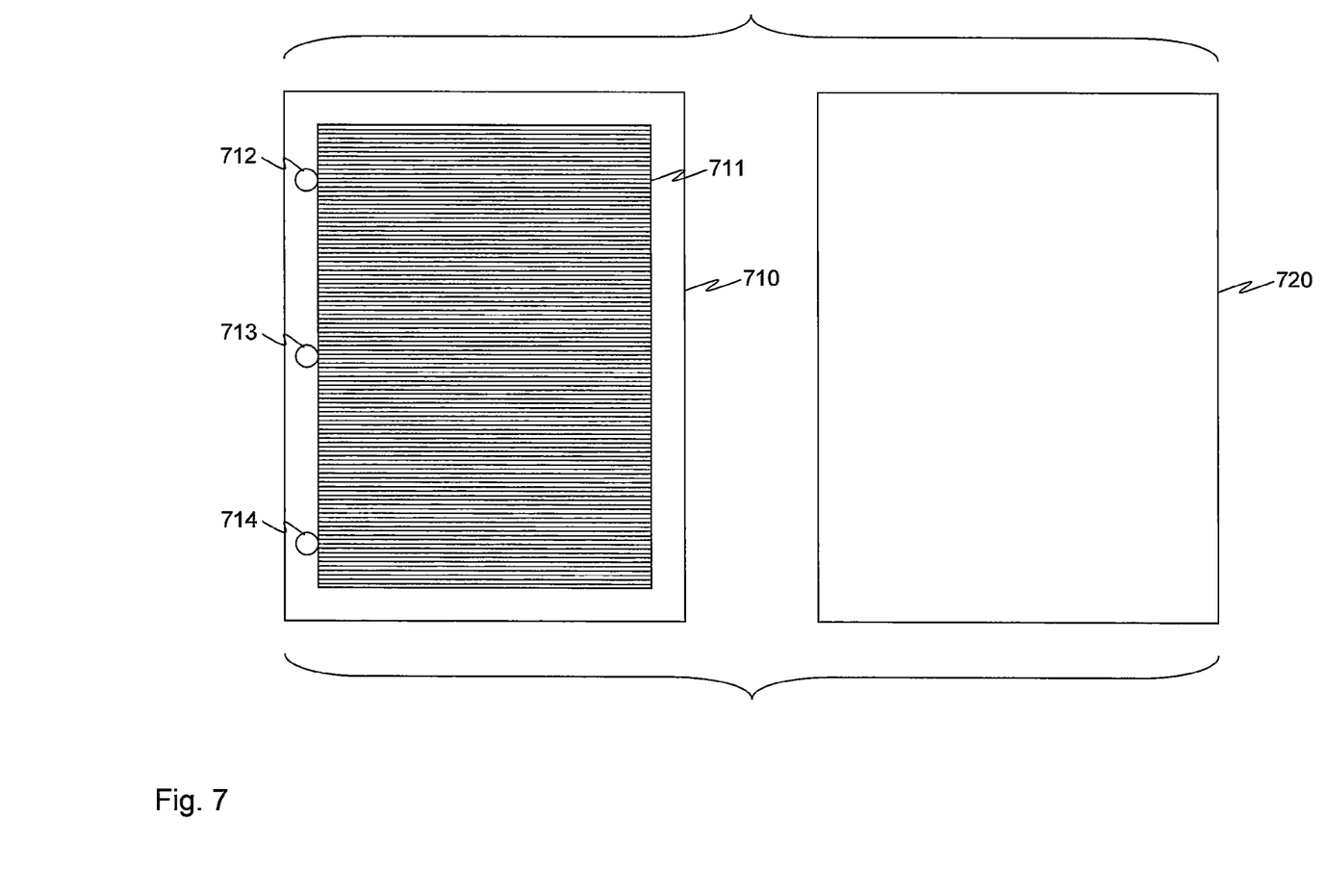
FIG. 7 is a diagram representing corresponding obverse and reverse scanned images of a fourth example page.

FIG. 7 is a diagram representing corresponding obverse and reverse scanned images 710, 720 of a fourth example page. The obverse scanned image contains typewritten text 711. The obverse scanned image 710 also contains several artifacts, namely three hole-punch artifacts 712, 713, 714. The reverse page 720 lacks typewritten text and artifacts. Together, this indicates that the scanned page is single-sided photocopy of a hole-punched page. The artifact characterizer 220 of FIG. 2 thus provides one or more appropriate characterizations, and the image modifier 230 of FIG. 2 processes the obverse and reverse scanned images 710, 720 based on the one or more characterizations and the operating parameter(s) 240 of FIG. 2. For example, the operating parameter(s) 240 of FIG. 2 may be such that the image modifier 230 of FIG. 2 is directed to associate a flag with the reverse scanned image 720 or delete the reverse scanned image 720 outright.

Figure 8:
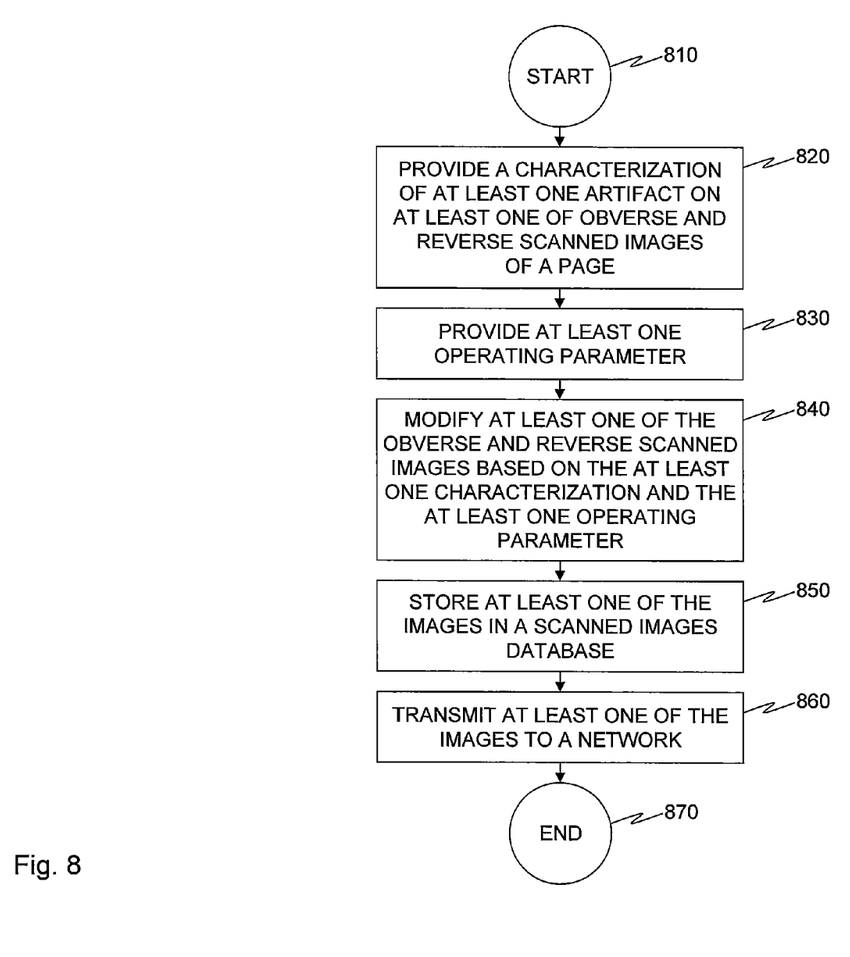
FIG. 8 is a flow diagram of one embodiment of a method of processing scanned images.

FIG. 8 is a flow diagram of one embodiment of a method of processing scanned images. The method begins in a start step 810 with obverse and reverse scanned images of a page. In a step 820, at least one characterization of at least one artifact on the obverse and reverse scanned images is provided. In a step 830, at least one operating parameter is also provided. In a step 840, at least one of the obverse and reverse scanned images is modified based on the at least one characterization and the at least one operating parameter. In a step 850, at least one of the (unmodified or modified) images is stored in a scanned images database. In a step 860, at least one of the images is transmitted to a network. The method ends in an end step 870.

Those skilled in the art to which this application relates will appreciate that other and further additions, deletions, substitutions and modifications may be made to the described embodiments.

What is claimed is:

1. A scanned image processing system, comprising:
 an artifact characterizer configured to provide a characterization of at least one artifact on at least one of obverse and reverse scanned images of a page based on a comparison between said obverse and reverse scanned images; and
 an image modifier associated with said artifact characterizer and configured to modify at least one of said obverse and reverse scanned images based on said characterization and at least one operating parameter.

2. The system as recited in claim 1 wherein said characterization is that said page contains at least one of a staple puncture and a hole punch.

3. The system as recited in claim 2 wherein said at least one operating parameter is configured to cause said image modifier to one of:
 take no action with respect to said obverse and reverse scanned images,
 associate a flag representing said characterization with at least one of said obverse and reverse scanned images,
 modify at least one of said obverse and reverse scanned images by removing artifacts corresponding to said at least one of said staple puncture and said hole punch, and
 modify at least one of said obverse and reverse scanned images by deleting one of said obverse and reverse scanned images.

4. The system as recited in claim 1 wherein said characterization is that a photocopy of at least one of a staple puncture and a hole punch is printed on said page.

5. The system as recited in claim 4 wherein said at least one operating parameter is configured to cause said image modifier to one of:
 take no action with respect to said obverse and reverse scanned images,
 associate a flag representing said characterization with at least one of said obverse and reverse scanned images,
 modify at least one of said obverse and reverse scanned images by removing artifacts corresponding to said at least one of said staple puncture and said hole punch, and
 modify at least one of said obverse and reverse scanned images by deleting one of said obverse and reverse scanned images.

6. The system as recited in claim 1 wherein said characterization is that said page contains at least one missing peripheral portion.

7. The system as recited in claim 6 wherein said at least one operating parameter is configured to cause said image modifier to one of:
 take no action with respect to said obverse and reverse scanned images,
 associate a flag representing said characterization with at least one of said obverse and reverse scanned images,
 modify at least one of said obverse and reverse scanned images by removing artifacts corresponding to said at least one missing peripheral portion, and
 modify at least one of said obverse and reverse scanned images by deleting one of said obverse and reverse scanned images.

8. The system as recited in claim 1 wherein said characterization is that a photocopy of at least one missing peripheral portion is printed on said page.

9. The system as recited in claim 8 wherein said at least one operating parameter is configured to cause said image modifier to one of:
 take no action with respect to said obverse and reverse scanned images,
 associate a flag representing said characterization with at least one of said obverse and reverse scanned images,
 modify at least one of said obverse and reverse scanned images by removing artifacts corresponding to said at least one missing peripheral portion, and
 modify at least one of said obverse and reverse scanned images by deleting one of said obverse and reverse scanned images.

10. The system as recited in claim 1 wherein said characterization is that said page was folded when said obverse and reverse scanned images were created.

11. The system as recited in claim 10 wherein said at least one operating parameter is configured to cause said image modifier to one of:
 take no action with respect to said obverse and reverse scanned images,
 associate a flag representing said characterization with at least one of said obverse and reverse scanned images, modify at least one of said obverse and reverse scanned images by replacing a portion of one of said obverse and reverse scanned images with a rotated portion of another of said obverse and reverse scanned images, and modify at least one of said obverse and reverse scanned images by deleting one of said obverse and reverse scanned images.

12. The system as recited in claim 1 wherein said characterization is that said page is blank on one side thereof.

13. The system as recited in claim 12 wherein said at least one operating parameter is configured to cause said image modifier to one of:

take no action with respect to said obverse and reverse scanned images, associate a flag representing said characterization with at least one of said obverse and reverse scanned images, and modify at least one of said obverse and reverse scanned images by deleting one of said obverse and reverse scanned images.

14. The system as recited in claim 1 wherein said image modifier is configured to receive said at least one operating parameter from a user.

15. A method of processing scanned images, comprising:

providing a characterization of at least one artifact on at least one of obverse and reverse scanned images of a page based on a comparison between said obverse and reverse scanned images; and modifying at least one of said obverse and reverse scanned images based on said characterization and at least one operating parameter.

16. The method as recited in claim 15 wherein said characterization is that said page contains at least one of a staple puncture and a hole punch.

17. The method as recited in claim 16 wherein said at least one operating parameter is configured to cause said image modifier to one of:

take no action with respect to said obverse and reverse scanned images, associate a flag representing said characterization with at least one of said obverse and reverse scanned images, modify at least one of said obverse and reverse scanned images by removing artifacts corresponding to said at least one of said staple puncture and said hole punch, and modify at least one of said obverse and reverse scanned images by deleting one of said obverse and reverse scanned images.

18. The method as recited in claim 15 wherein said characterization is that a photocopy of at least one of a staple puncture and a hole punch is printed on said page.

19. The method as recited in claim 18 wherein said at least one operating parameter is configured to cause said image modifier to one of:

take no action with respect to said obverse and reverse scanned images, associate a flag representing said characterization with at least one of said obverse and reverse scanned images, modify at least one of said obverse and reverse scanned images by removing artifacts corresponding to said at least one of said staple puncture and said hole punch, and modify at least one of said obverse and reverse scanned images by deleting one of said obverse and reverse scanned images.

20. The method as recited in claim 15 wherein said characterization is that said page contains at least one missing peripheral portion.

21. The method as recited in claim 20 wherein said at least one operating parameter is configured to cause said image modifier to one of:

take no action with respect to said obverse and reverse scanned images, associate a flag representing said characterization with at least one of said obverse and reverse scanned images, modify at least one of said obverse and reverse scanned images by removing artifacts corresponding to said at least one missing peripheral portion, and modify at least one of said obverse and reverse scanned images by deleting one of said obverse and reverse scanned images.

22. The method as recited in claim 15 wherein said characterization is that a photocopy of at least one missing peripheral portion is printed on said page.

23. The method as recited in claim 22 wherein said at least one operating parameter is configured to cause said image modifier to one of:

take no action with respect to said obverse and reverse scanned images, associate a flag representing said characterization with at least one of said obverse and reverse scanned images, modify at least one of said obverse and reverse scanned images by removing artifacts corresponding to said at least one missing peripheral portion, and modify at least one of said obverse and reverse scanned images by deleting one of said obverse and reverse scanned images.

24. The method as recited in claim 15 wherein said characterization is that said page was folded when said obverse and reverse scanned images were created.

25. The method as recited in claim 24 wherein said at least one operating parameter is configured to cause said image modifier to one of:

take no action with respect to said obverse and reverse scanned images, associate a flag representing said characterization with at least one of said obverse and reverse scanned images, modify at least one of said obverse and reverse scanned images by replacing a portion of one of said obverse and reverse scanned images with a rotated portion of another of said obverse and reverse scanned images, and modify at least one of said obverse and reverse scanned images by deleting one of said obverse and reverse scanned images.

26. The method as recited in claim 15 wherein said characterization is that said page is blank on one side thereof.

27. The method as recited in claim 26 wherein said at least one operating parameter is configured to cause said image modifier to one of:

take no action with respect to said obverse and reverse scanned images, associate a flag representing said characterization with at least one of said obverse and reverse scanned images, and modify at least one of said obverse and reverse scanned images by deleting one of said obverse and reverse scanned images.

28. The method as recited in claim 15 wherein said image modifier is configured to receive said at least one operating parameter from a user.

29. A document conversion system, comprising:

an image scanner configured to derive a sequence of obverse and reverse scanned images from a corresponding sequence of source documents;

an artifact characterizer configured to provide characterizations of artifacts on said obverse and reverse scanned images based on a comparison between said obverse and reverse scanned images;
an image modifier associated with said artifact characterizer and configured to modify at least one of said obverse and reverse scanned images based on said characterization and at least one operating parameter;
a scanned images database associated with said image scanner and configured to store at least some of said obverse and reverse scanned images; and
a network interface associated with said scanned images database and configured to transmit at least some of said obverse and reverse scanned images to a network.

30. The system as recited in claim 29 wherein said image modifier is configured to receive said at least one operating parameter from a user.

\* \* \* \* \*